R. B. MORRIS.
COTTON CHOPPER.
APPLICATION FILED JAN. 8, 1917.
1,227,294.
Patented May 22, 1917.
2 SHEETS—SHEET 2.
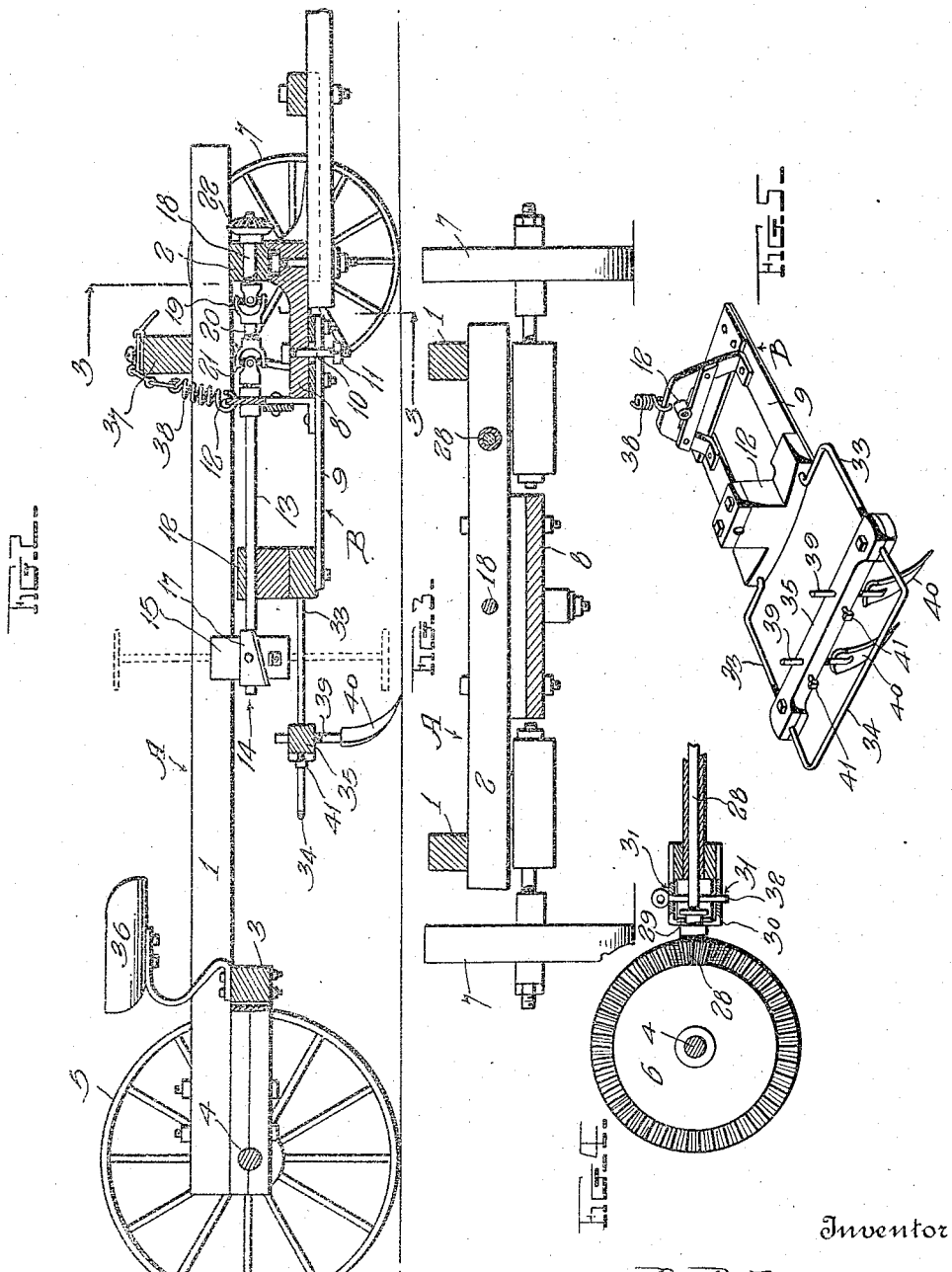

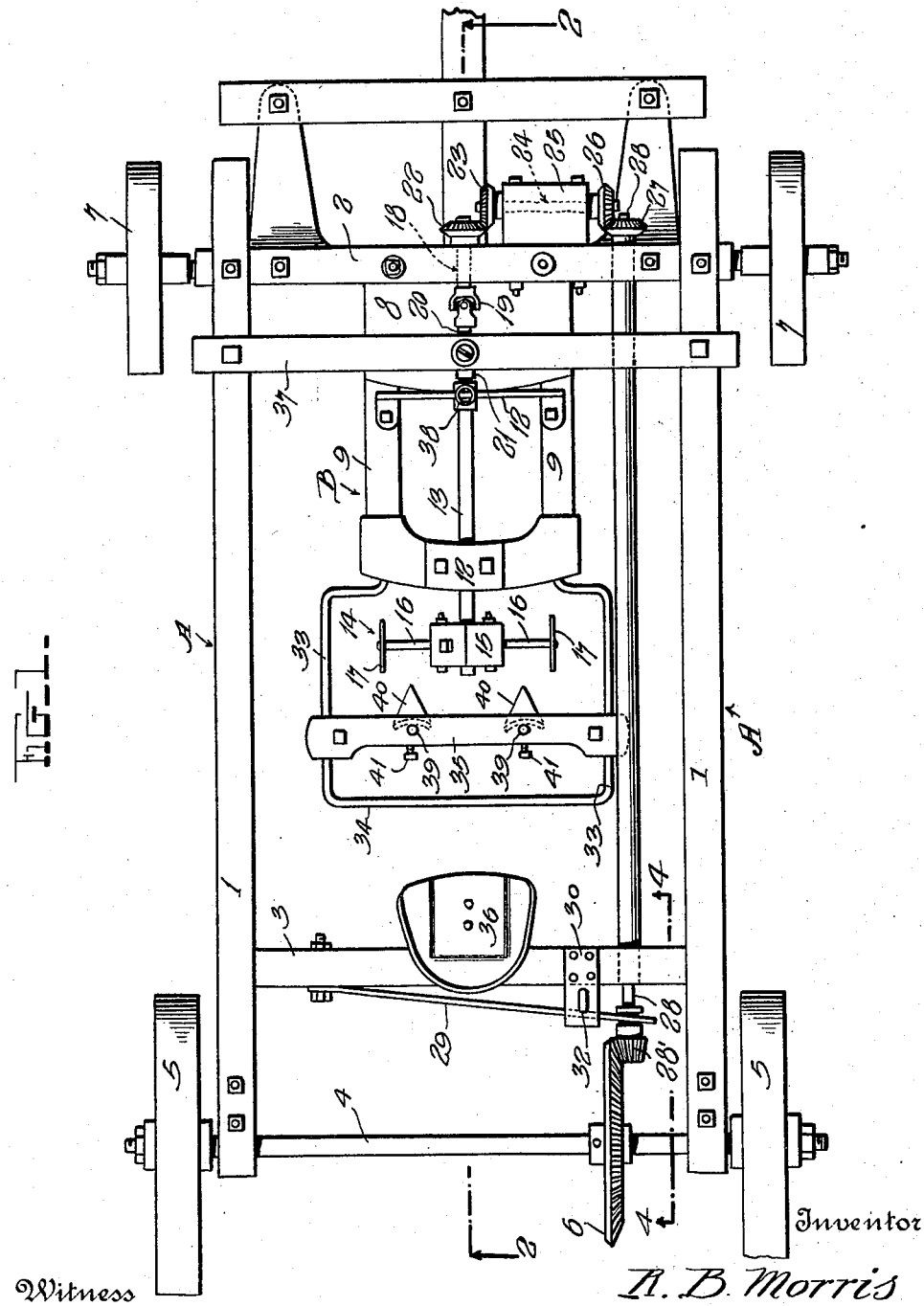

UNITED STATES PATENT OFFICE.

ROBERT B. MORRIS, OF HARRISONVILLE, MISSOURI, ASSIGNOR OF ONE-THIRD TO WALTER O. HOLCOMB AND ONE-THIRD TO FRANKLYN S. FREEMAN, BOTH OF HARRISONVILLE, MISSOURI.

COTTON-CHOPPER.

1,227,294.  Specification of Letters Patent.  Patented May 22, 1917.

Application filed January 8, 1917.  Serial No. 141,220.

*To all whom it may concern:*

Be it known that I, ROBERT B. MORRIS, a citizen of the United States, residing at Harrisonville, in the county of Cass and State of Missouri, have invented certain new and useful Improvements in Cotton-Choppers; and I do declare the following to be a full, clear, and exact description of the invention, such as will enable others skilled in the art to which it appertains to make and use the same.

This invention relates generally to agricultural machines and more particularly to certain new and useful improvements in cotton choppers.

The primary object of the invention is to provide a device of this character wherein the chopping element is mounted upon a supplemental frame which is movably connected to the main frame of the device so that the chopper may be moved with respect to said main frame to accurately follow the row despite any deflection of the draft team from side to side and to accommodate any irregularities of the ground without interfering with its rotary motion or the driving mechanism.

Another object of the invention is to generally improve upon machines of this character by the provision of a simple, strong, durable and comparatively inexpensive construction, and one which will be efficient and reliable in operation, and well adapted to the purpose for which it is designed.

With these and numerous other objects in view, the invention consists of certain novel features of construction, and the combination and arrangement of parts as will be hereinafter fully described and claimed.

In the accompanying drawings in which like parts are designated by similar reference characters throughout the several views—

Figure 1 is a top plan view of a device constructed in accordance with this invention;

Fig. 2 is a longitudinal sectional view of the same taken on the plane indicated by the line 2—2 of Fig. 1;

Fig. 3 is a transverse sectional view taken on the plane indicated by the line 3—3 of Fig. 2;

Fig. 4 is a detail sectional view taken on the plane indicated by the line 4—4 of Fig. 1; and, Fig. 5 is a perspective view of the supplemental frame detached from the main frame.

The present invention in its preferred embodiment consists of a main frame A, a supplemental frame B carrying a chopping element, and driving connections interposed between the chopping element on the supplemental frame and the driving wheels of the main frame. The main frame A is of open rectangular configuration, and is composed of a pair of longitudinal or side bars 1 connected at their forward and rear ends respectively by a forward end bar 2 and a rear end bar 3. These end bars 2 and 3 are, as shown by the drawings, secured to the lower edges of the side bars 1 by suitable bolts.

Revolubly mounted in bearings formed at the extreme rear ends of the side bars 1 of the main frame is the axle 4 of the driving wheels 5, the latter being disposed on the exterior of the frame A. Fixed or keyed in any suitable manner to the axle 4 between the side bars 1 of the frame is a comparatively large beveled gear 6, the purpose of which will be hereinafter described. At the forward end of the frame A are steering wheels 7, the purpose of which will be readily understood without further description.

Pivotally mounted at its forward end to the lower side of a lateral extension 8 of the end bar 2 is an open rectangular supplemental frame 9. Although this pivotal mounting may be of any convenient construction, yet it preferably as here shown consists of an ordinary pivot bolt 10 having a nut 11 on its free threaded end. The nut 11 is loose enough upon the bolt 10 so that the portion of the frame 9 clamped between the head of said bolt and the projection 8 will have a slight up and down movement. This affords a means whereby the frame 9 can be swung in a vertical direction as well as in a horizontal direction.

The opposite ends of the supplemental frame 9 are provided with bearings 12 in which is revolubly mounted a shaft 13. The rear end of the shaft 13 projects a short distance to the rear of the frame 9 and is provided with a suitable chopping element 14. This chopping element 14 preferably consists of a block 15, which is fixed to the shaft 13 and is provided with radially extending arms 16 having hoes 17 at their free ends.

Revolubly mounted in a suitable bearing in the forward end bar 2 of the frame A is a short shaft section 18, the rear end of which is provided with a universal joint 19 which couples said shaft section to one end of the link 20, the other end of the latter being similarly connected by a second universal joint 21 to the forward end of the shaft 13. The forward end of the shaft section 18 is provided with a bevel gear 22 which meshes with a similar gear 23 fixed to one end of a transverse shaft 24, the latter being revolubly mounted in a suitable bearing 25 carried by the end bar 2. The other end of the shaft 24 is provided with a beveled gear 26 which meshes with a similar gear 27 carried by the forward end of a longitudinal shaft 28. This shaft 28 is disposed along one side of the main frame A and is mounted in suitable bearings in the end bars 2 and 3 of the same. The rear end of the shaft 28 is provided with a beveled gear 28', which is keyed to slide longitudinally of the same so as to be moved in and out of mesh with the above mentioned gear 6 carried by the axle 4. The hub portion of the gear 28' is provided with an annular groove in which is seated the forked end of a bar 29, the other end of which is pivotally connected to the rear side of the rear end bar 3 near one end thereof. Secured to the end bar 3 near the other end thereof is a C-shaped bracket 30 having vertically alined apertures 31 in its horizontal portions, and removably disposed in these apertures 31 is a pin 32, the purpose of which is to hold the arm 29 so that the gear 28' will be either locked out of mesh with the gear 6 or in mesh with the same.

Extending rearwardly from the supplemental frame 9 and in outwardly offset relation with regard to the sides of the same is a pair of arms 33, the rear ends of which are integrally united by the cross bar 34, while connected to the arms 33 in any suitable manner and disposed between the same and slightly spaced from the cross bar 34 is a second cross bar 35. These cross bars 34 and 35 form a foot rest for the occupant of a seat 36, which is mounted upon the main frame A in any convenient manner.

The reference numeral 37 designates a cross bar disposed between the side bars 1 of the main frame A near the forward end thereof and attached at its ends to the upper edges of the same. Connected to the intermediate portion of this cross bar is a coiled spring 38, the lower end of which is connected to the supplemental frame 9 in any manner, so as to maintain the latter normally in its uppermost or raised position.

The cross bar 35 disposed between the arms 33 carried by the supplemental frame 9 is provided with a pair of apertures, the latter being arranged on opposite sides of the vertical plane passing through the shaft 13, and in these apertures are disposed the shanks 39 of a pair of cultivator shovels 40. Suitable set screws 41 lock the shafts 39 in their vertically adjusted positions.

In operating the device, a driver positions himself upon the seat 36 and rests his feet upon the foot rest formed by the cross bars 34 and 35. By pressing downwardly upon this foot rest the cultivator shovels 40 and chopping element 14 may be moved to their desired vertical position. The frame 9 may also be swung horizontally to the right or left to allow it to accurately follow the row despite any deflection on the part of the draft team from side to side. From the foregoing description, taken in connection with the accompanying drawings, the construction, use, and the operation of the device will be readily understood without a more extended explanation.

As numerous changes in form, proportion and in the minor details of construction, may be resorted to without departing from the spirit of this invention, I do not wish to be limited to the construction herein shown and described other than as claimed.

I claim:

1. A device of the class described comprising an open rectangular wheeled main frame, a seat mounted upon said main frame near the rear end thereof, a small supplemental frame pivoted at its forward end to the forward end of said main frame to swing both horizontally and vertically, a foot rest at the rear end of said supplemental frame disposed within the reach of the occupant of said seat, a shaft revolubly mounted upon said supplemental frame and extending longitudinally of the same, and provided at its rear end with a chopping element, a short longitudinally extending shaft section revolubly mounted upon the forward end of said main frame, a universal joint coupling the rear end of said shaft section to the forward end of said shaft on said supplemental frame, driving connections between said shaft sections and the wheels of said main frame, cultivator shovels carried by said supplemental frame, and a coiled spring connected to said main frame and to said supplemental frame for yieldably holding the rear end of the latter in its uppermost position.

2. A device of the class described comprising an open rectangular wheeled main frame, a seat mounted upon said main frame near the rear end thereof, a smaller open rectangular supplemental frame pivoted at its forward end to the forward end of said main frame midway of the width thereof to swing both horizontally and vertically, a pair of arms extending rearwardly from the rear end of said supplemental frame and being in outwardly offset relation with respect to the sides of the same, a pair of longitudinally spaced cross bars disposed between said arms and forming a foot rest for the occupant of said seat, a shaft revolubly mounted upon said supplemental frame and extending longitudinally of the same, and provided at its rear end with a chopping element, the latter being disposed in the rear of said supplemental frame and between said arms, a short longitudinally extending shaft section revolubly mounted upon the forward end of said main frame midway of the width thereof, a universal joint coupling the rear end of said shaft section to the forward end of said shaft on said supplemental frame, driving connections between said shaft section and the wheels of said main frame, cultivator shovels fixed to the forwardmost cross bar on opposite sides of the vertical plane passing through the shaft of said supplemental frame, and a coiled spring connected to said main frame and to said supplemental frame for yieldably holding the rear end of the latter in its uppermost position.

3. A device of the class described comprising an open rectangular main frame having a pair of driving wheels at its rear end and a pair of steering wheels at the forward end thereof, a seat mounted upon said main frame near the rear end thereof, a supplemental frame pivoted at its forward end to the forward end bar of said main frame and provided at its rear end with a foot rest disposed within the reach of the occupant of said seat, a longitudinally extending shaft revolubly mounted upon said supplemental frame and provided at its rear end with a chopping element, a short longitudinally extending shaft section revolubly mounted upon the forward end bar of said main frame, a link flexibly coupled by means of universal joints to the rear end of said shaft section and the forward end of the shaft of said supplemental frame, a transverse shaft revolubly mounted upon the forward end bar of said main frame, bevel gears on the adjacent ends of said transverse shaft and said shaft section, a longitudinal shaft revolubly mounted along one side of said main frame and having a clutched driving connection with said driving wheels at its rear end, the forward end of the last named longitudinal shaft being disposed adjacent the outer end of said transverse shaft, and additional bevel gears on the adjacent ends of the last named longitudinal shaft and said transverse shaft.

In testimony whereof I have hereunto set my hand in the presence of two subscribing witnesses.

ROBERT B. MORRIS.

Witnesses:
C. W. HIGHT,
FRANK S. FREEMAN.

Copies of this patent may be obtained for five cents each, by addressing the "Commissioner of Patents, Washington, D. C."